US010557360B2

(12) United States Patent
Boeke et al.

(10) Patent No.: US 10,557,360 B2
(45) Date of Patent: Feb. 11, 2020

(54) VANE INTERSEGMENT GAP SEALING ARRANGEMENT

(71) Applicant: United Technologies Corporation, Farmington, CT (US)

(72) Inventors: Mark A Boeke, Plainville, CT (US); Jeffrey J DeGray, Somers, CT (US); Richard M Salzillo, Jr., Plantsville, CT (US)

(73) Assignee: United Technologies Corporation, Farmington, CT (US)

( * ) Notice: Subject to any disclaimer, the term of this patent is extended or adjusted under 35 U.S.C. 154(b) by 672 days.

(21) Appl. No.: 15/295,694

(22) Filed: Oct. 17, 2016

(65) Prior Publication Data

US 2018/0106158 A1 Apr. 19, 2018

(51) Int. Cl.
*F01D 11/00* (2006.01)
*F16J 15/02* (2006.01)
*F01D 9/04* (2006.01)

(52) U.S. Cl.
CPC ............ *F01D 11/005* (2013.01); *F01D 9/041* (2013.01); *F16J 15/02* (2013.01); *F05D 2220/323* (2013.01); *F05D 2240/12* (2013.01); *F05D 2240/55* (2013.01); *F05D 2240/57* (2013.01); *F05D 2240/80* (2013.01); *F05D 2250/75* (2013.01)

(58) Field of Classification Search
CPC ...... F01D 11/005; F01D 11/006; F01D 9/041; F01D 9/065; F01D 25/12; F05D 2220/323; F05D 2240/55; F05D 2240/57; F05D 2240/80; F05D 2240/81; F05D 2250/75; F16J 15/02
See application file for complete search history.

(56) References Cited

U.S. PATENT DOCUMENTS 4,012,167 A * 3/1977 Noble ..................... F01D 5/187
                                                    416/97 A
4,524,980 A * 6/1985 Lillibridge ............ F01D 11/008
                                                      277/641

(Continued)

FOREIGN PATENT DOCUMENTS

EP    2369139    9/2011
EP    2867471    5/2015

(Continued)

OTHER PUBLICATIONS

European Patent Office, European Search Report dated Feb. 19, 2018 in Application No. 17193497.9-1006.

*Primary Examiner* — David E Sosnowski
*Assistant Examiner* — Wayne A Lambert
(74) *Attorney, Agent, or Firm* — Snell & Wilmer, L.L.P.

(57) ABSTRACT

A stator vane rail is provided. The stator vane rail may comprise a forward rail, an aft rail located axially opposite the forward rail, a first axial surface extending between the forward rail and the aft rail, a first feather seal slot disposed in the first axial surface, wherein a terminus of the first feather seal slot is radially spaced from a radial surface of the aft rail, a second axial surface extending between the forward rail and the aft rail, and a second feather seal slot disposed in the second axial surface, wherein the second feather seal slot extends from the radial surface of the aft rail.

17 Claims, 7 Drawing Sheets

(56) References Cited

U.S. PATENT DOCUMENTS

| | | | | |
|---|---|---|---|---|
| 4,668,164 A * | 5/1987 | Neal | F01D 9/041 | 415/116 |
| 4,720,236 A * | 1/1988 | Stevens | F01D 9/042 | 415/116 |
| 4,767,260 A * | 8/1988 | Clevenger | F01D 9/041 | 415/115 |
| 5,154,577 A * | 10/1992 | Kellock | F01D 11/005 | 277/641 |
| 5,531,457 A * | 7/1996 | Tibbott | F01D 11/006 | 277/590 |
| 5,641,267 A * | 6/1997 | Proctor | F01D 11/08 | 415/173.1 |
| 5,655,876 A * | 8/1997 | Rock | F01D 9/041 | 415/138 |
| 6,241,467 B1 * | 6/2001 | Zelesky | F01D 5/187 | 415/115 |
| 6,254,333 B1 * | 7/2001 | Merry | F01D 5/187 | 29/889.2 |
| 6,261,058 B1 * | 7/2001 | Kataoka | F01D 5/288 | 415/189 |
| 7,534,088 B1 * | 5/2009 | Alvanos | F01D 5/081 | 415/115 |
| 7,600,967 B2 * | 10/2009 | Pezzetti, Jr. | F01D 11/005 | 415/115 |
| 7,625,174 B2 * | 12/2009 | Drerup | F01D 9/041 | 415/135 |
| 8,360,716 B2 * | 1/2013 | Bergman | F01D 9/02 | 415/190 |
| 8,707,712 B2 * | 4/2014 | Spangler | F01D 25/12 | 415/115 |
| 8,727,710 B2 * | 5/2014 | Propheter-Hinckley | F01D 11/005 | 415/139 |
| 9,863,259 B2 * | 1/2018 | Boeke | F01D 9/042 | |
| 2005/0232752 A1 * | 10/2005 | Meisels | F01D 25/24 | 415/116 |
| 2013/0011265 A1 * | 1/2013 | Miller | F01D 11/008 | 416/191 |
| 2013/0115065 A1 * | 5/2013 | Correia | F01D 11/005 | 415/182.1 |
| 2014/0147263 A1 * | 5/2014 | Bergman | F01D 9/042 | 415/208.1 |
| 2016/0003079 A1 * | 1/2016 | Boeke | F01D 11/005 | 415/1 |
| 2016/0245093 A1 | 8/2016 | Deibel | | |

FOREIGN PATENT DOCUMENTS

| | | |
|---|---|---|
| EP | 3034805 | 6/2016 |
| WO | 2014052220 | 4/2014 |

* cited by examiner

VANE INTERSEGMENT GAP SEALING ARRANGEMENT

FIELD

The present disclosure relates to gas turbine engines, and more specifically, to feather seal arrangements for stator vane rails for gas turbine engines.

BACKGROUND

Gas turbine engines typically include at least a compressor section to pressurize inflowing air, a combustor section to burn a fuel in the presence of the pressurized air, and a turbine section to extract energy from the resulting combustion gases. One or more sections of the gas turbine engine may include a plurality of vane assemblies having vanes interspersed between rotor assemblies that carry the blades of successive stages of the section. Gas turbine engines may have various secondary airflow streams to provide cooling air to gas turbine engine components including stator vane assemblies and/or rotor assemblies. The vane assemblies may include feather seals disposed between each circumferentially disposed vane assembly. Losses in delivery of cooling air may have a negative effect on engine fuel burn, performance/efficiency, and component durability.

SUMMARY

In various embodiments, a stator vane rail is disclosed. The stator vane rail may comprise a forward rail, an aft rail located axially opposite the forward rail, a first axial surface extending between the forward rail and the aft rail, a first feather seal slot disposed in the first axial surface, wherein a terminus of the first feather seal slot is radially spaced from a radial surface of the aft rail, a second axial surface extending between the forward rail and the aft rail, and a second feather seal slot disposed in the second axial surface, wherein the second feather seal slot extends from the radial surface of the aft rail.

In various embodiments, the second axial surface may be located circumferentially opposite the first axial surface. The first feather seal slot may extend in a radial direction from the terminus of the first feather seal slot. The first feather seal slot may comprise an L-shape and the second feather seal slot may comprise an L-shape. The first feather seal slot may comprise a T-shape and the second feather seal slot may comprise a T-shape. The first feather seal slot may be configured to retain a feather seal in the radial direction. The second feather seal slot may be configured to allow venting between a plenum and a secondary flow path.

In various embodiments, a stator vane assembly is disclosed. A stator vane assembly may comprise a stator vane having a first end opposite a second end, an ID stator vane rail coupled to the first end, and an OD stator vane rail coupled to the second end. The OD stator vane rail may comprise an OD forward rail, and an OD aft rail located axially opposite the OD forward rail. The OD stator vane rail may comprise a first axial surface extending between the OD forward rail and the OD aft rail, a first feather seal slot disposed in the first axial surface, wherein a terminus of the first feather seal slot is radially spaced from a radial surface of the OD aft rail, a second axial surface extending between the OD forward rail and the OD aft rail, and a second feather seal slot disposed in the second axial surface, wherein the second feather seal slot extends from the radial surface of the OD aft rail.

In various embodiments, the ID stator vane rail may comprise an ID forward rail and an ID aft rail located axially opposite the ID forward rail. The ID stator vane rail may comprise a third axial surface extending between the ID forward rail and the ID aft rail, a third feather seal slot disposed in the third axial surface, wherein a terminus of the third feather seal slot is radially spaced from a radial surface of the ID aft rail, a fourth axial surface extending between the ID forward rail and the ID aft rail, and a fourth feather seal slot disposed in the fourth axial surface, wherein the fourth feather seal slot extends from the radial surface of the ID aft rail. The second axial surface may be located circumferentially opposite the first axial surface. The fourth axial surface may be located circumferentially opposite the third axial surface. The first feather seal slot and the third feather seal slot may be configured to retain a feather seal in a radial direction. The second feather seal slot may be configured to allow venting between a plenum and a secondary flow path. The fourth feather seal slot may be configured to aid in metering a flow of a fluid between a core flow path and an ID plenum.

In various embodiments, a gas turbine engine is disclosed. A gas turbine engine may comprise a turbine section, and a stator vane assembly in the turbine section. The stator vane assembly may comprise a stator vane having a first end opposite a second end, an ID stator vane rail coupled to the first end, and an OD stator vane rail coupled to the second end. The OD stator vane rail may comprise an OD forward rail, and an OD aft rail located axially opposite the OD forward rail. The OD stator vane rail may comprise a first axial surface extending between the OD forward rail and the OD aft rail, a first feather seal slot disposed in the first axial surface, wherein a terminus of the first feather seal slot is radially spaced from a radial surface of the OD aft rail, a second axial surface extending between the OD forward rail and the OD aft rail, and a second feather seal slot disposed in the second axial surface, wherein the second feather seal slot extends from the radial surface of the OD aft rail.

In various embodiments, the ID stator vane rail may comprise an ID forward rail and an ID aft rail located axially opposite the ID forward rail, wherein the ID stator vane rail comprises a third axial surface extending between the ID forward rail and the ID aft rail, a third feather seal slot disposed in the third axial surface, wherein a terminus of the third feather seal slot is radially spaced from a radial surface of the ID aft rail, a fourth axial surface extending between the ID forward rail and the ID aft rail, and a fourth feather seal slot disposed in the fourth axial surface, wherein the fourth feather seal slot extends from the radial surface of the ID aft rail. The second axial surface may be located circumferentially opposite the first axial surface. The fourth axial surface may be located circumferentially opposite the third axial surface. The gas turbine engine may further comprise an OD leading edge seal located forward an OD leading edge of the OD aft rail. The gas turbine engine may further comprise an OD trailing edge seal located aft an OD trailing edge of the OD aft rail.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with a tail (e.g., the back end) of an aircraft, or generally, to the direction of exhaust of a gas turbine engine. As used herein, "forward" refers to the direction associated with a nose (e.g., the front end) of the aircraft, or generally, to the direction of flight or motion.

Figure 2A:
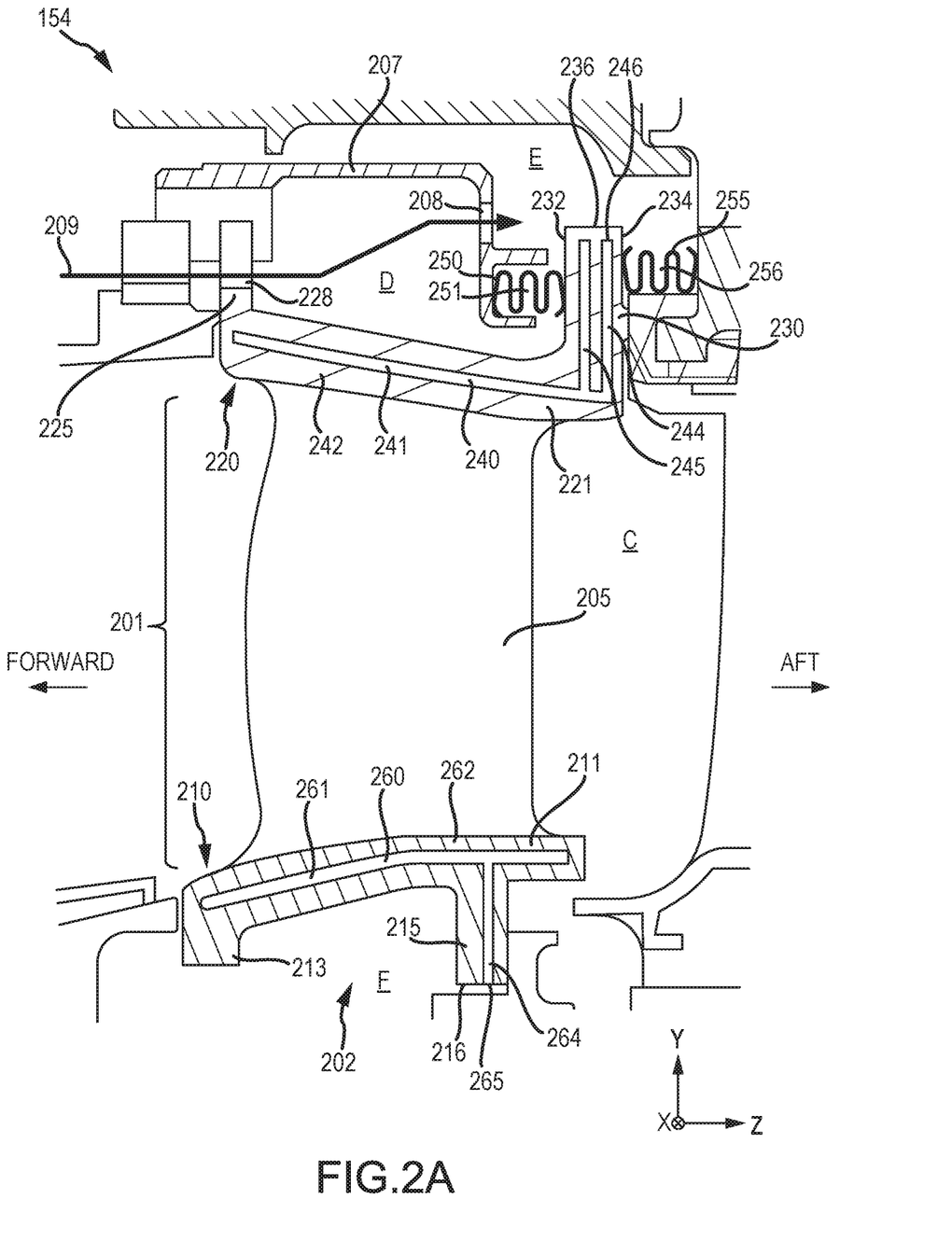
FIG. 2A illustrates a cross-section view of a high pressure turbine section of a gas turbine engine comprising a first feather seal slot and a fourth feather seal slot, in accordance with various embodiments.
Figure 2B:
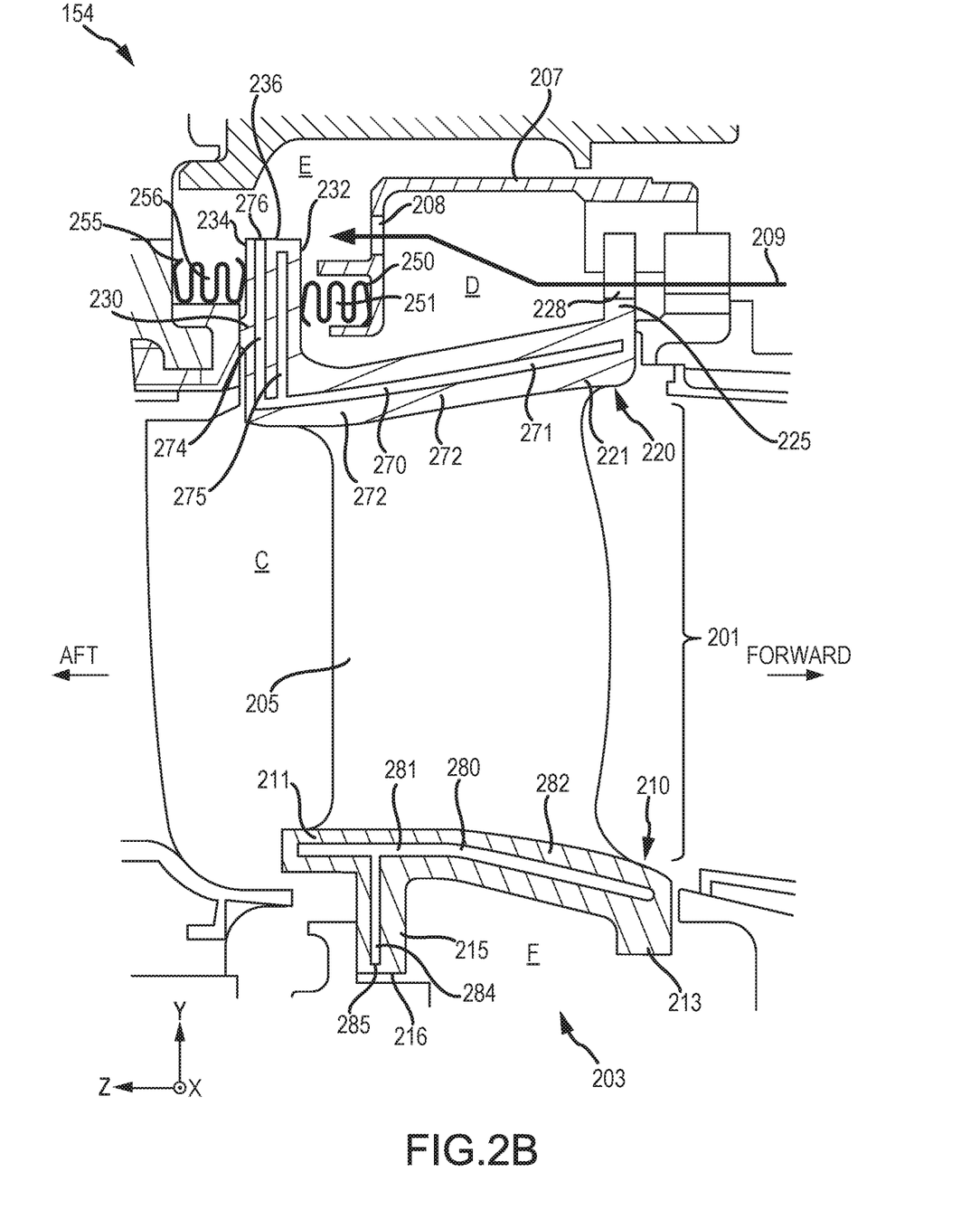
FIG. 2B illustrates a cross-section view of a high pressure turbine section of a gas turbine engine comprising a second feather seal slot and a third feather seal slot, in accordance with various embodiments.
Figure 3A:
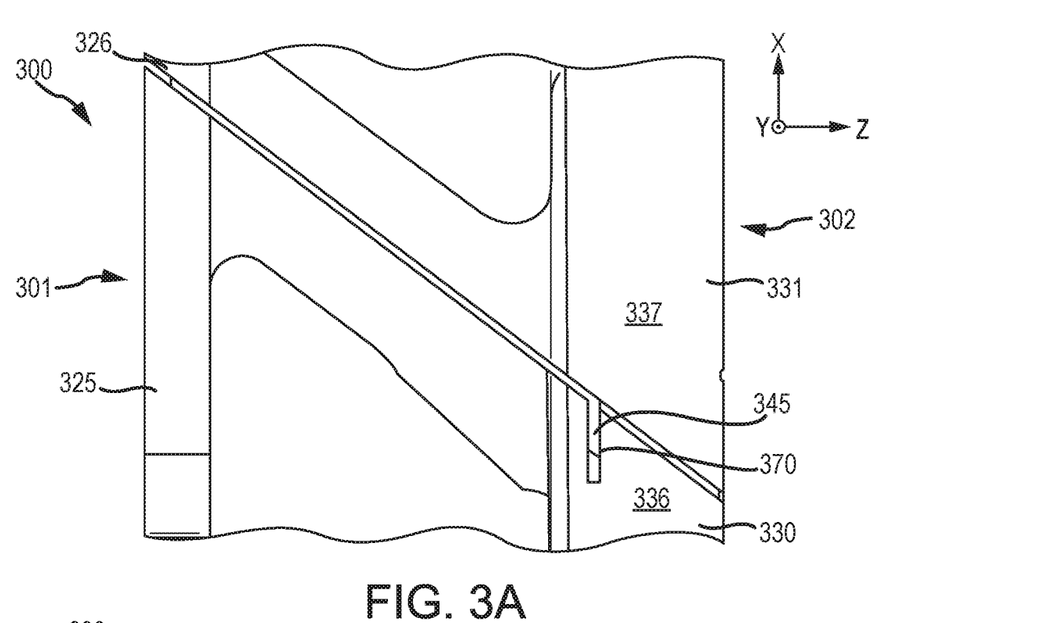
FIG. 3A illustrates an outward looking radially inward view of a stator vane arraignment, in accordance with various embodiments.
Figure 3B:
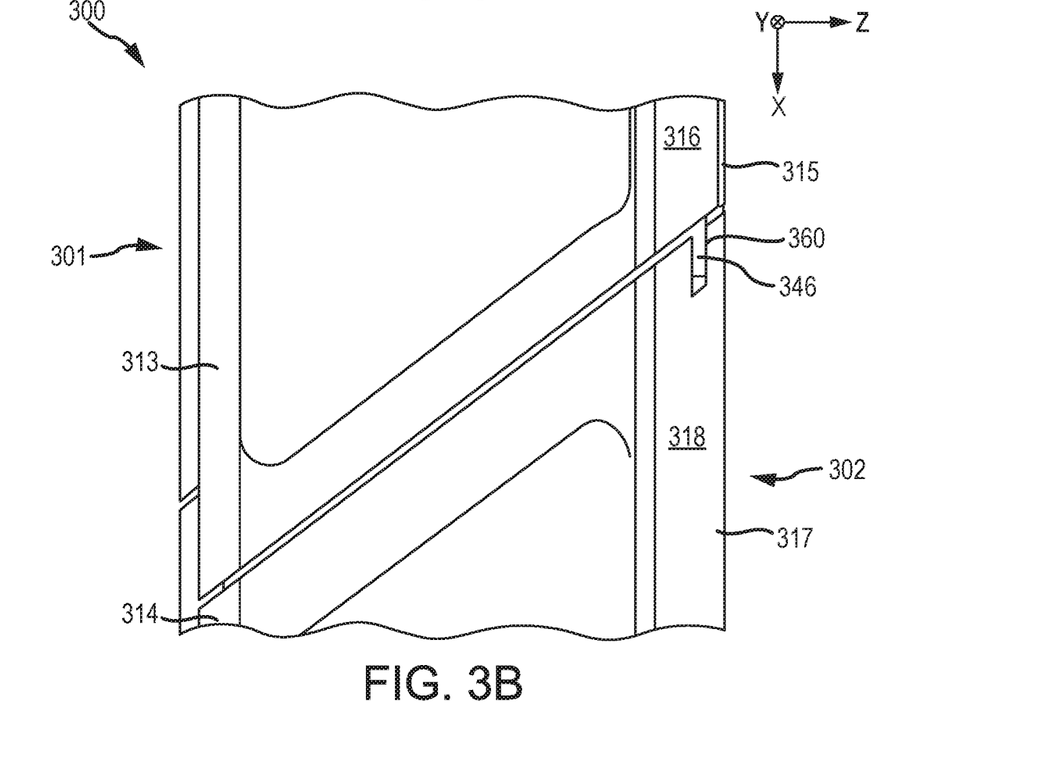
FIG. 3B illustrates an inward looking radially outward view of the stator vane arraignment of FIG. 3A, in accordance with various embodiments.
Figure 4A:
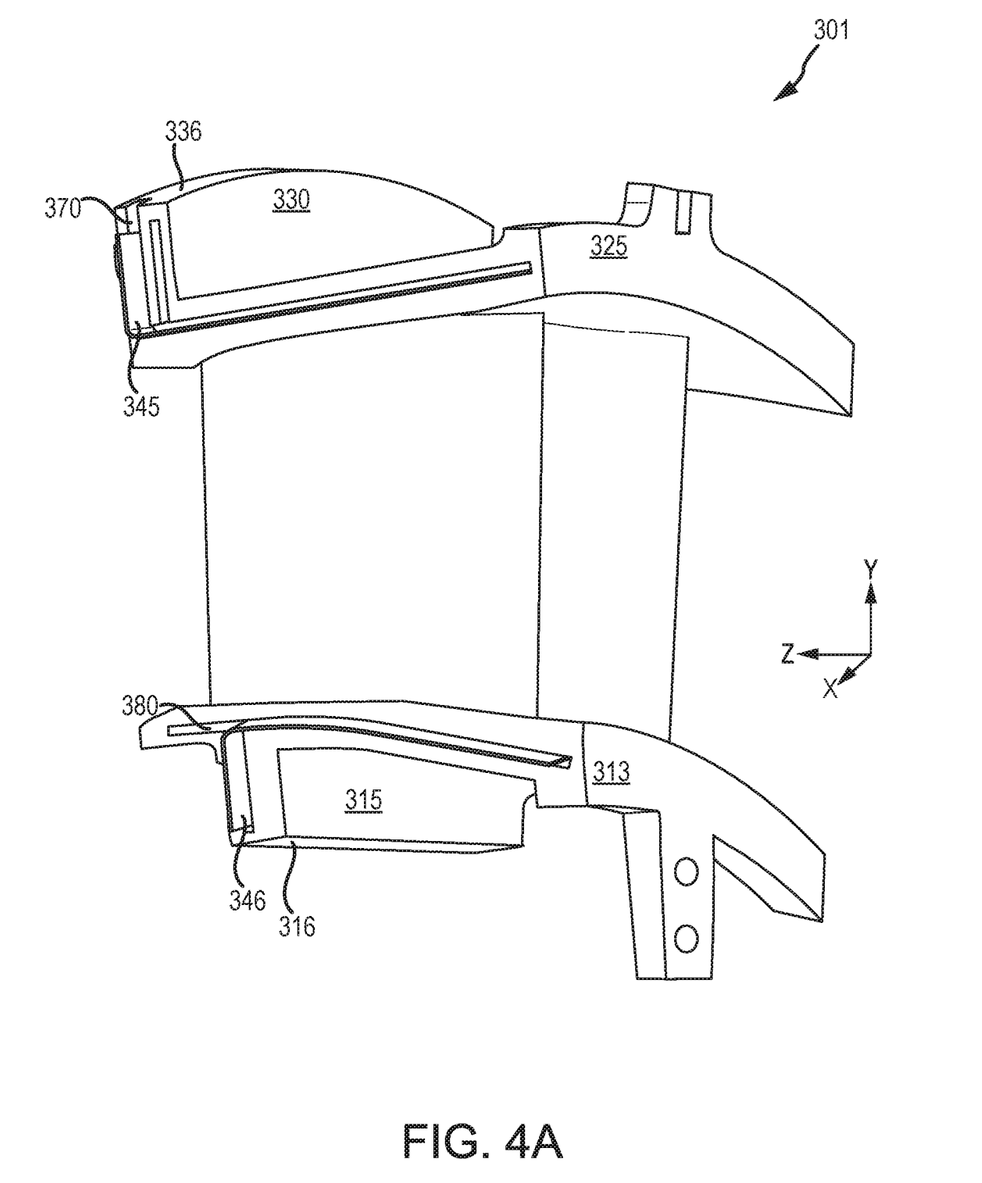
FIG. 4A illustrates a perspective view of a of stator vane assembly, in accordance with various embodiments.
Figure 4B:
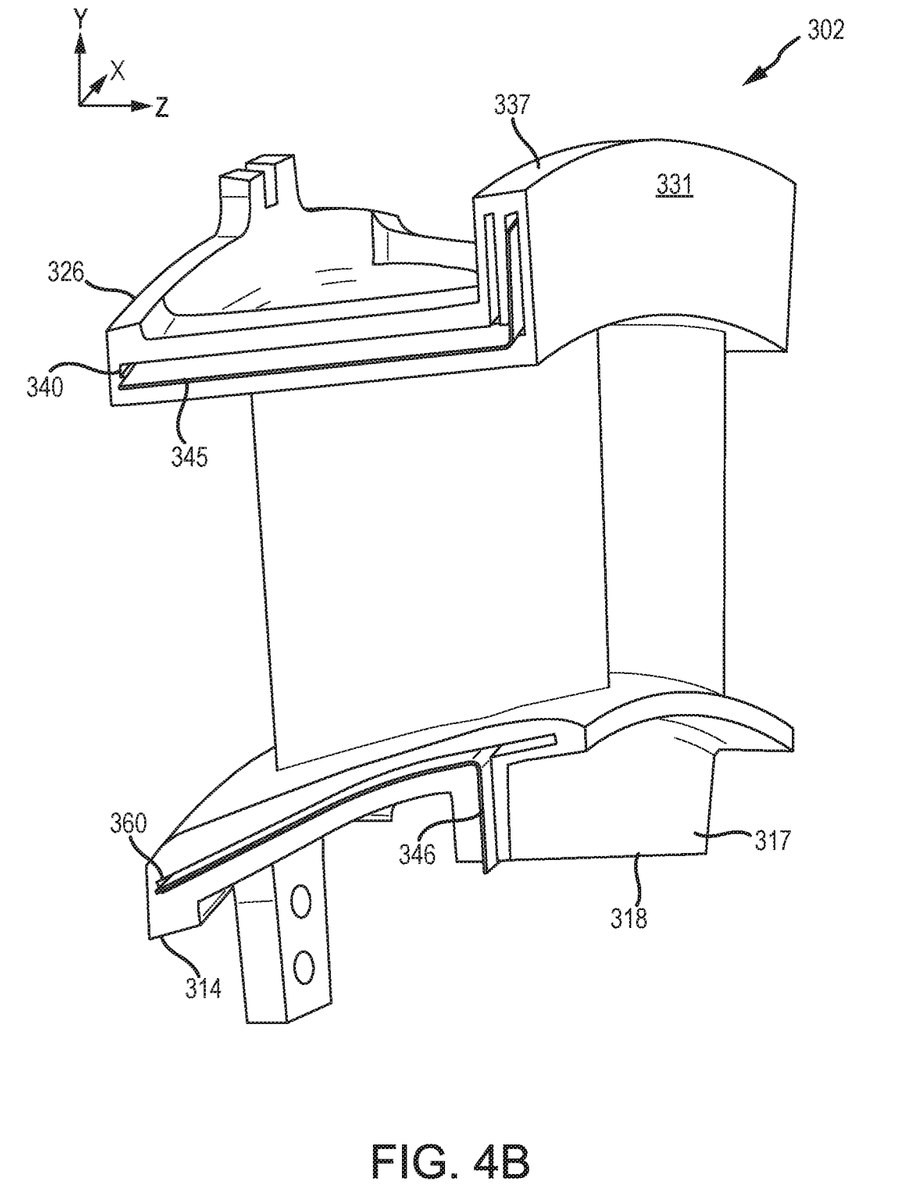
FIG. 4B illustrates a perspective view of a of stator vane assembly, in accordance with various embodiments.

With respect to FIG. 2B, elements with like element numbering, as depicted in FIG. 2A, are intended to be the same and will not necessarily be repeated for the sake of clarity. With respect to FIG. 4A and FIG. 4B, elements with like element numbering, as depicted in FIG. 3A and FIG. 3B, are intended to be the same and will not necessarily be repeated for the sake of clarity. With respect to FIG. 5, elements with like element numbering, as depicted in FIG. 4A and FIG. 4B, are intended to be the same and will not necessarily be repeated for the sake of clarity.

Typically a stator vane assembly may include a feather seal slot wherein a feather seal is located. The feather seal may prevent leakage to the core flow path of a turbine engine. The feather seal slot may be open to a radial surface of the stator vane assembly to allow venting from between as plenum and a secondary flow path. The feather seal slot may be closed to a radial surface of the stator vane assembly to contain the feather seal within the feather seal slot. In various embodiments, a stator vane arrangement is disclosed herein, wherein, in response to the feather seal being in an installed position, the feather seal is partially located within a feather seal slot open to said radial surface and partially located within a feather seal slot closed to said radial surface. Thus, the combined benefit of said venting and said containing is achieved.

Figure 1:
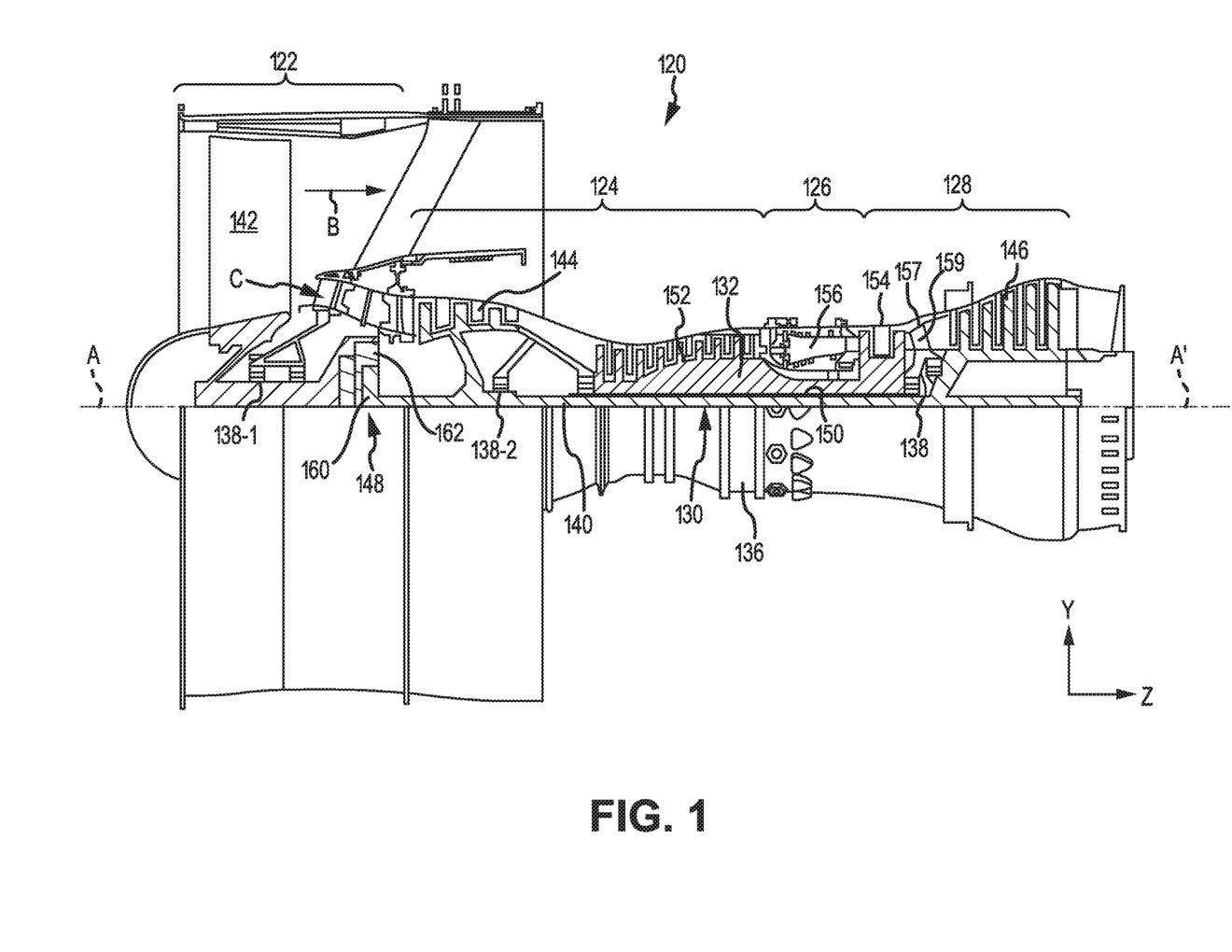
FIG. 1 illustrates a cross-section view of a gas turbine engine, in accordance with various embodiments.

In various embodiments, and with reference to FIG. 1, a gas turbine engine 120 is disclosed. Gas turbine engine 120 may comprise a two-spool turbofan that generally incorporates a fan section 122, a compressor section 124, a combustor section 126, and a turbine section 128. Gas turbine engine 120 may also comprise, for example, an augmenter section, and/or any other suitable system, section, or feature. In operation, fan section 122 may drive air along a bypass flow-path B, while compressor section 124 may further drive air along a core flow-path C for compression and communication into combustor section 126, before expansion through turbine section 128. FIG. 1 provides a general understanding of the sections in a gas turbine engine, and is not intended to limit the disclosure. The present disclosure may extend to all types of applications and to all types of turbine engines, including, for example, turbojets, turboshafts, and three spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

In various embodiments, gas turbine engine 120 may comprise a low speed spool 130 and a high speed spool 132 mounted for rotation about an engine central longitudinal axis A-A' relative to an engine static structure 136 via one or more bearing systems 138 (shown as, for example, bearing system 138-1 and bearing system 138-2 in FIG. 1). It should be understood that various bearing systems 138 at various locations may alternatively or additionally be provided, including, for example, bearing system 138, bearing system 138-1, and/or bearing system 138-2.

In various embodiments, low speed spool 130 may comprise an inner shaft 140 that interconnects a fan 142, a low pressure (or a first) compressor section 144, and a low pressure (or a second) turbine section 146. Inner shaft 140 may be connected to fan 142 through a geared architecture 148 that can drive fan 142 at a lower speed than low speed spool 130. Geared architecture 148 may comprise a gear assembly 160 enclosed within a gear housing 162. Gear assembly 160 may couple inner shaft 140 to a rotating fan structure. High speed spool 132 may comprise an outer shaft 150 that interconnects a high pressure compressor ("HPC") 152 (e.g., a second compressor section) and high pressure (or a first) turbine section 154. A combustor 156 may be located between HPC 152 and high pressure turbine 154. A mid-turbine frame 157 of engine static structure 136 may be located generally between high pressure turbine 154 and low pressure turbine 146. Mid-turbine frame 157 may support one or more bearing systems 138 in turbine section 128. Inner shaft 140 and outer shaft 150 may be concentric and may rotate via bearing systems 138 about engine central longitudinal axis A-A'. As used herein, a "high pressure" compressor and/or turbine may experience a higher pressure than a corresponding "low pressure" compressor and/or turbine.

In various embodiments, the air along core airflow C may be compressed by low pressure compressor 144 and HPC 152, mixed and burned with fuel in combustor 156, and expanded over high pressure turbine 154 and low pressure turbine 146. Mid-turbine frame 157 may comprise airfoils 159 located in core airflow path C. Low pressure turbine 146 and high pressure turbine 154 may rotationally drive low speed spool 130 and high speed spool 132, respectively, in response to the expansion.

In various embodiments, and with reference to FIG. 2A, a section of high pressure turbine 154 of FIG. 1 is depicted in greater detail. FIG. 2A illustrates a view of a first axial end 202 of stator vane assembly 201. High pressure turbine 154 may comprise a stator vane assembly 201. Stator vane assembly 201 may comprise a stator vane 205 configured to direct airflow through high pressure turbine 154. Stator vane 205 may be coupled at a first end to inner diameter (ID) stator vane rail 210 and at a second end to outer diameter (OD) stator vane rail 220. In various embodiments, stator vane 205 may be the first forward stator vane located in high pressure turbine 154. ID stator vane rail 210 may be radially spaced apart from OD stator vane rail 220. In various embodiments, OD stator vane rail 220 may form a portion of an outer core engine structure, and ID stator vane rail 210 may form a portion of an inner core engine structure to at least partially define an annular core gas flow path through high pressure turbine 154. In various embodiments, stator vane assembly 201 may comprise multiple components wherein ID stator vane rail 210 and OD stator vane rail 220 are coupled to stator vane 205 to form stator vane assembly 201. In various embodiments, stator vane assembly 201 may comprise a single component wherein stator vane 205, ID stator vane rail 210, and OD stator vane rail 220 may also comprise a single casting. In various embodiments, stator vane 205, ID stator vane rail 210, and OD stator vane rail 220 may comprise any suitable material, such as, for example, an age-hardenable, nickel-based superalloy.

In various embodiments, ID stator vane rail 210 may comprise an inner platform 211, an ID forward rail 213, and an ID aft rail 215. Inner platform 211 may be configured to couple ID stator vane rail 210 to stator vane 205. ID forward rail 213 may be located forward of ID aft rail 215. ID forward rail 213 and ID aft rail 215 may be configured to direct an ID cooling airflow to provide cooling air to ID engine components (such as, for example, blade outer air seals (BOAS), vane supports, seals, cases, and/or the like). In various embodiments, OD stator vane rail 220 may comprise an outer platform 221, an OD forward rail 225 and an OD aft rail 230. Outer platform 221 may be configured to couple OD stator vane rail 220 to stator vane 205. OD forward rail 225 may be located forward of OD aft rail 230. OD forward rail 225 may comprise a forward rail aperture 228 configured to allow a cooling airflow.

In various embodiments, high pressure turbine 154 may also comprise an OD flow rail 207. OD flow rail 207 may be configured to direct a cooling airflow along the outer diameter of high pressure turbine 154. In that regard, OD flow rail 207 and OD stator vane rail 220 may define a secondary airflow path 209 to allow cooling air to flow through high pressure turbine 154 and cool OD engine components (such as, for example, an OD BOAS). In that regard, OD flow rail 207 and OD stator vane rail 220 may define a plenum D. The cooling air may flow through secondary airflow path 209 by passing through forward rail aperture 228, through a vane support aperture 208 in OD flow rail 207, and over OD aft rail 230.

In various embodiments, with continued reference to FIG. 2A, high pressure turbine 154 may also comprise a feather seal slot (also referred to herein as a first feather seal slot) 240. Feather seal slot 240 may comprise a trench located on an axial surface 242 of OD stator vane rail 220. Feather seal slot 240 may comprise an L-shaped trench with an axial portion 241 extending in a direction substantially parallel to the flow of gas in core flow path C (see FIG. 1) and a radial portion 244 extending in a radial direction. Although it is contemplated that feather seal slot 240 may comprise a single radial portion, FIG. 2A illustrates a second radial portion 245. In this regard, feather seal slot 240 may comprise two radial portions (i.e., radial portion 244 and radial portion 245). Radial portion 244 and radial portion 245 of feather seal slot 240 may be disposed on axial surface 242 of OD aft rail 230 between leading edge 232 and trailing edge 234. Terminus 246 of radial portion 244 may be radially spaced from radial surface 236 of OD aft rail 230. Radial surface 236 may comprise a radially outer surface of OD aft rail 230. In various embodiments, feather seal slot 240 may comprise a trench machined into axial surface 242 of OD stator vane rail 220. In various embodiments, OD stator vane rail 220 may also be cast, additively manufactured, and/or the like to comprise feather seal slot 240. Feather seal slot 240 may comprise any shape and size suitable to fit a feather seal (e.g., feather seal 345, with brief reference to FIG. 4A), such as, for example, a rectangular shape, an L-shape, and/or a T-shape.

In various embodiments, high pressure turbine 154 may also comprise a feather seal slot (also referred to herein as a fourth feather seal slot) 260. Feather seal slot 260 may comprise a trench located on an axial surface 262 of ID stator vane rail 210. Feather seal slot 260 may comprise a T-shaped trench with an axial portion 261 extending in a direction substantially parallel to the flow of gas in core flow path C (see FIG. 1) and a radial portion 264 extending in a radial direction. Radial portion 264 of feather seal slot 260 may be disposed on axial surface 262 of ID aft rail 215. Terminus 265 of radial portion 264 may be radially in line with radial surface 216 of ID aft rail 215. In this regard, radial portion 264 may extend from radial surface 216. Radial surface 216 may comprise a radially inner surface of ID aft rail 215. In various embodiments, feather seal slot 260 may comprise a trench machined into axial surface 262 of ID stator vane rail 210. In various embodiments, ID stator vane rail 210 may also be cast, additively manufactured, and/or the like to comprise feather seal slot 260. Feather seal slot 260 may comprise any shape and size suitable to fit a feather seal (e.g., feather seal 346, with brief reference to FIG. 4A), such as, for example, a rectangular shape, an L-shape, and/or a T-shape. An ID plenum F may be located radially inward from ID stator vane rail 210.

In various embodiments, high pressure turbine 154 may also comprise an OD leading edge seal 250 and an OD trailing edge seal 255. In various embodiments, OD leading edge seal 250 may be configured to provide an airflow seal between OD flow rail 207 and OD aft rail 230 to reduce airflow leakage. In that regard, OD leading edge seal 250 may be disposed within an OD forward annular cavity 251 adjacent to and aft of OD flow rail 207 and forward of OD aft rail 230. OD leading edge seal 250 may form a "W" shape, and/or any other suitable shape, and may be biased outwardly from engine central longitudinal axis A-A'. The "W" shape may also enable OD leading edge seal 250 to compress when placed into OD forward annular cavity 251, further improving the seal and reducing airflow leakage. A secondary flow cavity E may be located radially outward from OD leading edge seal 250. OD leading edge seal 250 may comprise any suitable material capable of sealing and/or minimizing airflow leakage, such as, for example, a nickel alloy or a nickel chromium alloy.

In various embodiments, OD trailing edge seal 255 may be configured to provide an improved airflow seal aft of OD aft rail 230 to reduce airflow leakage. In that regard, OD trailing edge seal 255 may be located aft of OD aft rail 230 and disposed within an OD aft annular cavity 256. OD trailing edge seal 255 may form a "W" shape, and/or any other suitable shape, and may be biased inwardly towards engine central longitudinal axis A-A'. The "W" shape may also enable OD trailing edge seal 255 to compress when placed into OD aft annular cavity 256, further improving the seal and reducing airflow leakage. OD trailing edge seal 255 may comprise any suitable material capable of sealing and/or minimizing airflow leakage, such as, for example, a nickel alloy or a nickel chromium alloy.

In various embodiments, and with reference to FIG. 2B, the opposite side of the stator vane assembly 201 of FIG. 2A is depicted. FIG. 2B illustrates a view of a second axial end 203 of stator vane assembly 201. In various embodiments, high pressure turbine 154 may also comprise a feather seal slot (also referred to herein as a second feather seal slot) 270. Feather seal slot 270 may comprise a trench located on an axial surface 272 of OD stator vane rail 220. Axial surface 272 and axial surface 242 (with momentary reference to FIG. 2A) may be located at opposite ends of stator vane assembly 201. Feather seal slot 270 may comprise an L-shaped trench with an axial portion 271 extending in a direction substantially parallel to the flow of gas in core flow path C (see FIG. 1) and a radial portion 274 extending in a radial direction. Although it is contemplated that feather seal slot 270 may comprise a single radial portion, FIG. 2B illustrates a second radial portion 275. In this regard, feather seal slot 270 may comprise two radial portions (i.e., radial portion 274 and radial portion 275). Radial portion 274 and radial portion 275 of feather seal slot 270 may be disposed on axial surface 272 of OD aft rail 230 between leading edge 232 and trailing edge 234. Terminus 276 of radial portion 274 may be radially in line with radial surface 236 of OD aft rail 230. In this regard, radial portion 274 may extend from radial surface 236. In various embodiments, feather seal slot 270 may comprise a trench machined into axial surface 272 of OD stator vane rail 220. In various embodiments, OD stator vane rail 220 may also be cast, additively manufactured, and/or the like to comprise feather seal slot 270. Feather seal slot 270 may comprise any shape and size suitable to fit a feather seal (e.g., feather seal 345, with brief reference to FIG. 4B), such as, for example, a rectangular shape, an L-shape, and/or a T-shape.

In various embodiments, high pressure turbine 154 may also comprise a feather seal slot (also referred to herein as a third feather seal slot) 280. Feather seal slot 280 may comprise a trench located on an axial surface 282 of ID stator vane rail 210. Feather seal slot 280 may comprise a T-shaped trench with an axial portion 281 extending in a direction substantially parallel to the flow of gas in core flow path C (see FIG. 1) and a radial portion 284 extending in a radial direction. Radial portion 284 of feather seal slot 280 may be disposed on axial surface 282 of ID aft rail 215. Terminus 285 of radial portion 284 may be radially spaced from radial surface 216 of ID aft rail 215. In this regard, a gap may exist between terminus 285 and radial surface 216 as measured in the radial direction (i.e., the y-direction). Radial surface 216 may comprise a radially inner surface of ID aft rail 215. In various embodiments, feather seal slot 280 may comprise a trench machined into axial surface 282 of ID stator vane rail 210. In various embodiments, ID stator vane rail 210 may also be cast, additively manufactured, and/or the like to comprise feather seal slot 280. Feather seal slot 280 may comprise any shape and size suitable to fit a feather seal (e.g., feather seal 346, with brief reference to FIG. 4B), such as, for example, a rectangular shape, an L-shape, and/or a T-shape.

With reference to FIG. 3A, a view of stator vane arrangement 300, looking radially inward, is illustrated, in accordance with various embodiments. Stator vane arrangement 300 may comprise a first stator vane assembly 301 and a second stator vane assembly 302. Stator vane assembly 301 may be circumferentially spaced from stator vane assembly 302. Stator vane assembly 301 and stator vane assembly 302 may be similar to stator vane assembly 201 (with momentary additional reference to FIG. 2A and FIG. 2B).

For clarity purposes, FIG. 4A illustrates a perspective, isolated view of stator vane assembly 301. With combined reference to FIG. 3A and FIG. 4A, stator vane assembly 301 may comprise an OD forward rail 325, an OD aft rail 330, a radial surface 336, and a feather seal slot 370. OD forward rail 325, OD aft rail 330, radial surface 336, and feather seal slot 370 may be similar to OD forward rail 225, OD aft rail 230, radial surface 236, and feather seal slot 270, respectively, as illustrated in FIG. 2B.

For clarity purposes, FIG. 4B illustrates a perspective, isolated view of stator vane assembly 302. With combined reference to FIG. 3A and FIG. 4B, stator vane assembly 302 may comprise an OD forward rail 326, an OD aft rail 331, a radial surface 337, and a feather seal slot 340. OD forward rail 326, OD aft rail 331, radial surface 337, and feather seal slot 340 may be similar to OD forward rail 225, OD aft rail 230, radial surface 236, and feather seal slot 240, respectively, as illustrated in FIG. 2A.

In various embodiments, and with combined reference to FIG. 1, FIG. 3A, FIG. 4A, and FIG. 4B, high pressure turbine 154 may also comprise a feather seal 345. Feather seal 345 may extend between stator vane assembly 301 and stator vane assembly 302. The feather seal 345 may extend into feather seal slot 370 (in the negative x-direction) and the feather seal 345 may extend into the feather seal slot 340 of stator vane assembly 302 (in the positive x-direction).

With combined reference to FIG. 2A through FIG. 3B, feather seal 345 may prevent leakage between core flow path C and plenum D. Feather seal 345 may be configured to further minimize air flow leakage in secondary airflow path 209. For example, and in various embodiments, feather seal 345 may be located in feather seal slot 240. The use of feather seal 345 in feather seal slot 240 may further minimize air flow leakage in the axial direction (with reference to engine central longitudinal axis A-A').

Feather seal slot 240, with terminus 246 being closed to radial surface 236, may prevent feather seal 345 from moving radially outward (i.e., in the positive y-direction). In contrast, feather seal slot 270, with terminus 276 being open to radial surface 236, may allow venting between plenum D and secondary flow cavity E. Thus, stator vane arrangement 300 may allow said venting, via feather seal slot 370, while containing feather seal 345 via feather seal slot 340. Feather seal 345 may comprise any shape, size, and material suitable to minimize air flow leakage. For example, feather seal 345 may comprise a small flat metal object, machined to size to fit within feather seal slot 240.

With reference to FIG. 3B, a view of stator vane arrangement 300, looking radially outward, is illustrated, in accordance with various embodiments. With combined reference to FIG. 3B and FIG. 4A, stator vane assembly 301 may comprise an ID forward rail 313, an ID aft rail 315, a radial surface 316, and a feather seal slot 380. ID forward rail 313, ID aft rail 315, radial surface 316, and feather seal slot 380 may be similar to ID forward rail 213, ID aft rail 215, radial surface 216, and feather seal slot 280, respectively, as illustrated in FIG. 2B. In this regard, the feather seal slot 380 of stator vane assembly 301 may not extend to radial surface 316 and thus is not visible in FIG. 3B.

With combined reference to FIG. 3B and FIG. 4B, stator vane assembly 302 may comprise an ID forward rail 314, an ID aft rail 317, a radial surface 318, and a feather seal slot 360. ID forward rail 314, ID aft rail 317, radial surface 318, and feather seal slot 360 may be similar to ID forward rail 213, ID aft rail 215, radial surface 216, and feather seal slot 260, respectively, as illustrated in FIG. 2A. With momentary additional reference to FIG. 4A, a feather seal 346 may extend between stator vane assembly 301 and stator vane assembly 302. The feather seal 346 may extend into feather seal slot 360 (in the positive x-direction) and the feather seal 346 may extend into feather seal slot 380 (in the negative x-direction). Similar to feather seal 345, feather seal 346 extends partially into a feather seal slot closed to a radial surface (i.e., radial surface 316) and extends partially into a feather seal slot open to a radial surface (i.e., radial surface 318).

Figure 5:
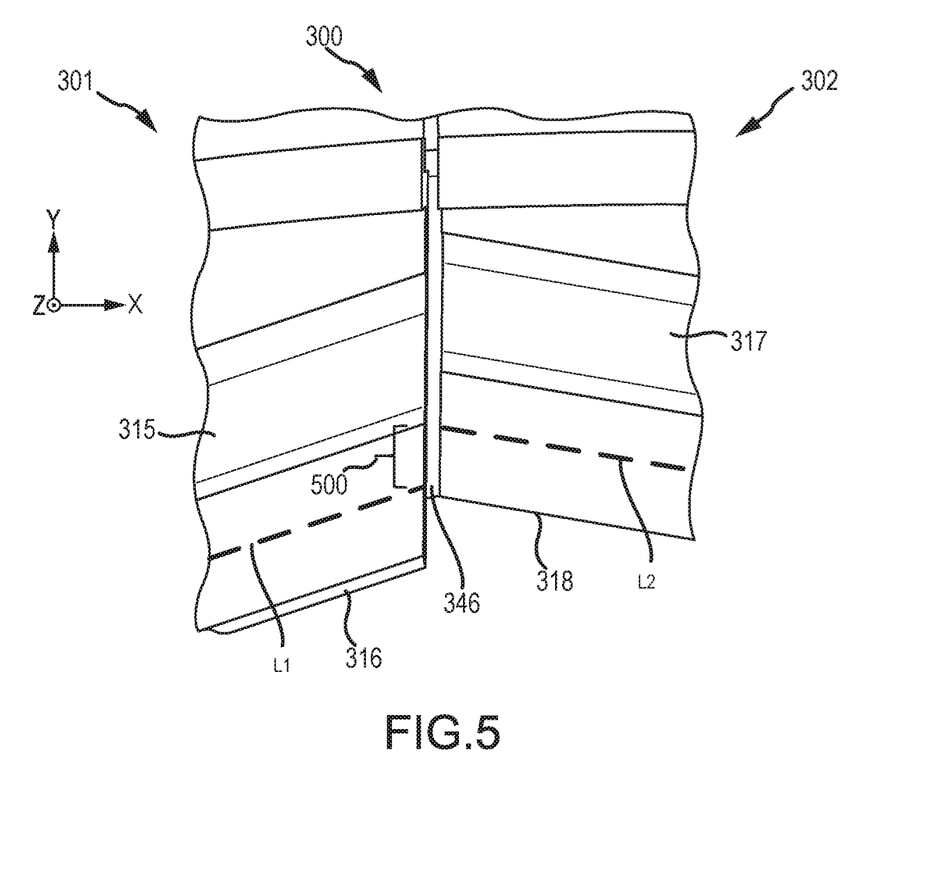
FIG. 5 illustrates an aft looking forward view of an inner diameter (ID) portion of the stator vane arrangement of FIG. 3A and FIG. 3B, in accordance with various embodiments.

With reference to FIG. 5, an aft looking forward view of stator vane arrangement 300 at the ID is illustrated, in accordance with various embodiments. In various embodiments, ID aft rail 315 may extend further radially inward (in the negative y-direction) than ID aft rail 317. ID aft rail 315 may comprise a chordal seal contact line $L_1$. Chordal seal contact line $L_1$ may comprise a location of pressure drop between core flow path C and ID plenum F (with momentary reference to FIG. 2A). Similarly, ID aft rail 317 may comprise a chordal seal contact line $L_2$. Chordal seal contact line $L_2$ may comprise a location of pressure drop between core flow path C and ID plenum F (with momentary reference to FIG. 2A). A radial gap 500 may exist between chordal seal contact line $L_1$ and chordal seal contact line $L_2$. In this regard, feather seal 346 may extend to and/or past chordal seal contact line $L_1$ (in the radial direction) to prevent leakage between core flow path C and ID plenum F at radial gap 500. In this regard, feather seal 346 may meter leakage at radial gap 500. Thus, feather seal slot 360 (with momentary reference to FIG. 4B) may aid in metering between a flow of fluid between core flow path C and ID plenum F (with momentary reference to FIG. 2A).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A stator vane rail, comprising:
   a forward rail;
   an aft rail located axially opposite the forward rail;
   a first axial surface extending between the forward rail and the aft rail;
   a first feather seal slot disposed in the first axial surface, wherein a terminus of a radial portion of the first feather seal slot is radially spaced from a circumferential surface of the aft rail;

a second axial surface extending between the forward rail and the aft rail, wherein the second axial surface is located circumferentially opposite the first axial surface; and a second feather seal slot disposed in the second axial surface, wherein a radial portion of the second feather seal slot is circumferentially aligned with the radial portion of the first feature seal slot, and the radial portion of the second feather seal slot extends from the circumferential surface of the aft rail.

2. The stator vane rail of claim 1, wherein the first feather seal slot extends in a radial direction from the terminus of the first feather seal slot.

3. The stator vane rail of claim 2, wherein the first feather seal slot comprises an L-shape and the second feather seal slot comprises an L-shape.

4. The stator vane rail of claim 2, wherein the first feather seal slot comprises a T-shape and the second feather seal slot comprises a T-shape.

5. The stator vane rail of claim 2, wherein the first feather seal slot is configured to retain a feather seal in the radial direction.

6. The stator vane rail of claim 2, wherein the second feather seal slot is configured to allow venting between a plenum and a secondary flow path.

7. A stator vane assembly, comprising:
a stator vane having a first end opposite a second end;
an ID stator vane rail coupled to the first end; and
an OD stator vane rail coupled to the second end, wherein the OD stator vane rail comprises:
an OD forward rail; and
an OD aft rail located axially opposite the OD forward rail, wherein the OD stator vane rail comprises:
a first axial surface extending between the OD forward rail and the OD aft rail;
a first feather seal slot disposed in the first axial surface, wherein a terminus of a radial portion of the first feather seal slot is radially spaced from a circumferential surface of the OD aft rail;
a second axial surface extending between the OD forward rail and the OD aft rail, wherein the second axial surface is located circumferentially opposite the first axial surface; and
a second feather seal slot disposed in the second axial surface, wherein a radial portion of the second feather seal slot is circumferentially aligned with the radial portion of the first feature seal slot, and
the radial portion of the second feather seal slot extends from the circumferential surface of the OD aft rail.

8. The stator vane assembly of claim 7, wherein the ID stator vane rail comprises:
an ID forward rail; and
an ID aft rail located axially opposite the ID forward rail, wherein the ID stator vane rail comprises:
a third axial surface extending between the ID forward rail and the ID aft rail;
a third feather seal slot disposed in the third axial surface, wherein a terminus of the third feather seal slot is radially spaced from a radial surface of the ID aft rail;
a fourth axial surface extending between the ID forward rail and the ID aft rail; and
a fourth feather seal slot disposed in the fourth axial surface, wherein the fourth feather seal slot extends from the radial surface of the ID aft rail.

9. The stator vane assembly of claim 8, wherein the fourth axial surface is located circumferentially opposite the third axial surface.

10. The stator vane assembly of claim 9, wherein the first feather seal slot and the third feather seal slot are configured to retain a feather seal in a radial direction.

11. The stator vane assembly of claim 10, wherein the second feather seal slot is configured to allow venting between a plenum and a secondary flow path.

12. The stator vane assembly of claim 11, wherein the fourth feather seal slot is configured to aid in metering a flow of a fluid between a core flow path and an ID plenum.

13. A gas turbine engine, comprising:
a turbine section; and
a stator vane assembly in the turbine section, the stator vane assembly comprising:
a stator vane having a first end opposite a second end;
an ID stator vane rail coupled to the first end; and
an OD stator vane rail coupled to the second end, wherein the OD stator vane rail comprises:
an OD forward rail; and
an OD aft rail located axially opposite the OD forward rail, wherein the OD stator vane rail comprises:
a first axial surface extending between the OD forward rail and the OD aft rail;
a first feather seal slot disposed in the first axial surface, wherein a terminus of a radial portion of the first feather seal slot is radially spaced from a circumferential surface of the OD aft rail;
a second axial surface extending between the OD forward rail and the OD aft rail, wherein the second axial surface is located circumferentially opposite the first axial surface; and
a second feather seal slot disposed in the second axial surface, wherein a radial portion of the second feather seal slot is circumferentially aligned' with the radial portion of the first feature seal slot, and
the radial portion of the second feather seal slot extends from the circumferential surface of the OD aft rail.

14. The gas turbine engine of claim 13, wherein the ID stator vane rail comprises:
an ID forward rail; and
an ID aft rail located axially opposite the ID forward rail, wherein the ID stator vane rail comprises:
a third axial surface extending between the ID forward rail and the ID aft rail;
a third feather seal slot disposed in the third axial surface, wherein a terminus of the third feather seal slot is radially spaced from a radial surface of the ID aft rail;
a fourth axial surface extending between the ID forward rail and the ID aft rail; and
a fourth feather seal slot disposed in the fourth axial surface, wherein the fourth feather seal slot extends from the radial surface of the ID aft rail.

15. The gas turbine engine of claim 14, wherein the fourth axial surface is located circumferentially opposite the third axial surface.

16. The gas turbine engine of claim 15, further comprising an OD leading edge seal located forward an OD leading edge of the OD aft rail.

17. The gas turbine engine of claim 16, further comprising an OD trailing edge seal located aft an OD trailing edge of the OD aft rail.

* * * * *